US008958600B2

(12) United States Patent
Othmezouri et al.

(10) Patent No.: US 8,958,600 B2
(45) Date of Patent: Feb. 17, 2015

(54) MONOCULAR 3D POSE ESTIMATION AND TRACKING BY DETECTION

(75) Inventors: Gabriel Othmezouri, Brussels (BE); Ichiro Sakata, Brussels (BE); Bernt Schiele, Saarbrucken (DE); Mykhaylo Andriluka, Saarbrucken (DE); Stefan Roth, Darmstadt (DE)

(73) Assignees: Toyota Motor Europe NV/SA, Brussels (BE); Technische Universitat Darmstadt, Darmstadt (DE)

( * ) Notice: Subject to any disclaimer, the term of this patent is extended or adjusted under 35 U.S.C. 154(b) by 34 days.

(21) Appl. No.: 13/702,266

(22) PCT Filed: Jun. 14, 2011

(86) PCT No.: PCT/EP2011/059854
§ 371 (c)(1),
(2), (4) Date: Dec. 5, 2012

(87) PCT Pub. No.: WO2011/154558
PCT Pub. Date: Dec. 15, 2011

(65) Prior Publication Data
US 2013/0142390 A1 Jun. 6, 2013

(30) Foreign Application Priority Data

Jun. 12, 2010 (EP) .................................... 10165776

(51) Int. Cl.
*G06K 9/00* (2006.01)
*G06T 7/20* (2006.01)
*G06E 1/00* (2006.01)

(52) U.S. Cl.
CPC ........ *G06K 9/00201* (2013.01); *G06K 9/00362* (2013.01); *G06K 9/00369* (2013.01);
(Continued)

(58) Field of Classification Search
USPC ......... 382/100, 103, 106–107, 116–117, 128, 382/154, 155, 162, 168, 173, 181, 184, 189, 382/199, 203, 209, 224, 232, 254, 274, 276, 382/285–291, 305, 312; 707/1; 706/14, 20
See application file for complete search history.

(56) References Cited

U.S. PATENT DOCUMENTS 7,558,762 B2 * 7/2009 Owechko et al. ................ 706/14
7,912,264 B2 * 3/2011 Freiburger et al. ........... 382/128
(Continued)

OTHER PUBLICATIONS

| Thomas Izo et al., "Simultaneous Pose Estimation and Camera Calibration from Multiple Views", | Proceedings of the 2004 IEEE Computer Society Conference on Computer Vision and Pattern | Recognition Workshop (CVPRW'04), Jun. 27, 2004, XP-010761957.*

(Continued)

*Primary Examiner* — Seyed Azarian
(74) *Attorney, Agent, or Firm* — Sughrue Mion, PLLC (57) ABSTRACT

Methods and apparatus are described for monocular 3D human pose estimation and tracking, which are able to recover poses of people in realistic street conditions captured using a monocular, potentially moving camera. Embodiments of the present invention provide a three-stage process involving estimating (10, 60, 110) a 3D pose of each of the multiple objects using an output of 2D tracking-by detection (50) and 2D viewpoint estimation (46). The present invention provides a sound Bayesian formulation to address the above problems. The present invention can provide articulated 3D tracking in realistic street conditions.

The present invention provides methods and apparatus for people detection and 2D pose estimation combined with a dynamic motion prior. The present invention provides not only 2D pose estimation for people in side views, it goes beyond this by estimating poses in 3D from multiple viewpoints. The estimation of poses is done in monocular images, and does not require stereo images. Also the present invention does not require detection of characteristic poses of people.

14 Claims, 9 Drawing Sheets

(52) U.S. Cl.
CPC ..... *G06T 7/2046* (2013.01); *G06T 2207/10016* (2013.01); *G06T 2207/30196* (2013.01); *G06T 2207/30232* (2013.01); *G06T 2207/30244* (2013.01)
USPC .............................. 382/103; 382/291; 706/20

(56) References Cited

U.S. PATENT DOCUMENTS

2007/0183669 A1    8/2007   Owechko et al.
2008/0109397 A1*   5/2008   Sharma et al. ................... 707/1

OTHER PUBLICATIONS

Mykhaylo Andriluka et al., "People-Tracking-by-Detection and People-Detection-by-Tracking", Computer Vision and Pattern Recognition, CVPR, IEEE Conference on, IEEE, Jun. 23, 2008, pp. 1-8, Piscataway, N J, XP-031297141.*

Thomas Izo et al., "Simultaneous Pose Estimation and Camera Calibration from Multiple Views", Proceedings of the 2004 IEEE Computer Society Conference on Computer Vision and Pattern Recognition Workshop (CVPRW'04), Jun. 27, 2004, XP-010761957.*

I Mykhaylo Andriluka et al., "People-Tracking-by-Detection and People-Detection-by-Tracking", Computer Vision and Pattern Recognition, CVPR, IEEE Conference on, IEEE, Jun. 23, 2008, pp. 1-8, [Piscataway, N J, XP-031297141.*

Mykhaylo Andriluka et al., "People-Tracking-by-Detection and People-Detection-by-Tracking", Computer Vision and Pattern Recognition, CVPR, IEEE Conference on, IEEE, Jun. 23, 2008, pp. 1-8, Piscataway, NJ, XP-031297141.

Michael J. Jones et al., "Fast Multi-view Face Detection", Technical Report Mitsubishi Electric Research Laboratories, Mitsubishi Electric Research Laboratories, Jun. 1, 2003, pp. 1-8, Cambridge, MA XP-002416302.

Josef Kittler, et al., "On Combining Classifiers", IEEE Transactions on Pattern Analysis and Machine Intelligence, IEEE Service Center, Mar. 1, 1998, pp. 226-239, vol. 20, No. 3, Los Alamitos, CA, XP-000767916.

Mykhaylo Andriluka et al., "Pictorial Structures Revisited: People Detection and Articulated Pose Estimation", Computer Vision and Pattern Recognition, CVPR 2009, IEEE Conference On, IEEE, Jun. 20, 2009, pp. 1014-1021, Piscataway, NJ, XP-031607281.

Bastian Leibe et al., "Coupled Detection and Trajectory Estimation for Multi-Object Tracking", Computer Vision, ICCV 2007, IEEE 11th International Conference on, IEEE, PI, Oct. 1, 2007, pp. 1-8, XP-031194425.

International Search Report of PCT/EP2011/059854 dated Dec. 29, 2011.

Written Opinion of the International Searching Authority of PCT/EP2011/059854 dated Dec. 29, 2011.

* cited by examiner

FIG. 4 a and b

MONOCULAR 3D POSE ESTIMATION AND TRACKING BY DETECTION

CROSS REFERENCE TO RELATED APPLICATIONS

This application is a National Stage of International Application No. PCT/EP2011/059854 filed Jun. 14, 2011, claiming priority based on European Patent Application No. 10165776.5 filed Jun. 12, 2010, the contents of all of which are incorporated herein by reference in their entirety.

FIELD OF THE INVENTION

This invention relates to apparatus and methods for image processing to detect objects such as humans, e.g. poses of humans and to corresponding computer programs for carrying out such methods and to memory devices storing the computer programs and also to corresponding integrated circuits.

TECHNICAL BACKGROUND

Automatic recovery of 3D human pose from monocular image sequences is a challenging and important topic with numerous applications including video indexing, automotive safety, and surveillance. Although current methods are able to recover 3D pose for a single person in controlled environments, they are severely challenged by real world scenarios, such as crowded street scenes, e.g. multiple people in cluttered scenes using a monocular, potentially moving camera.

Probably the most important challenge in articulated 3D tracking is the inherent ambiguity of 3D pose from monocular image evidence. This is particularly true for cluttered real-world scenes with multiple people that are often partially or even fully occluded for longer periods of time. Another important challenge, even for 2D pose recovery, is the complexity of human articulation and appearance. Additionally, complex and dynamically changing backgrounds of realistic scenes complicate data association across multiple frames. While many of these challenges have been addressed individually, addressing all of them simultaneously using a monocular, potentially moving camera has not been achieved.

Due to the difficulties involved in reliable 3D pose estimation, this task has often been considered in controlled laboratory settings with solutions frequently relying on background subtraction and simple image evidence, such as silhouettes or edge-maps. In order to constrain the search in high-dimensional pose spaces these approaches often use multiple calibrated cameras, complex dynamical motion priors, or detailed body models. Their combination allows to achieve impressive results, similar in performance to commercial marker-based motion capture systems. However, realistic street scenes do not satisfy many of the assumptions made by these systems. For such scenes multiple synchronized video streams are difficult to obtain, the appearance of people is significantly more complex, and robust extraction of evidence is challenged by frequent full and partial occlusions, clutter, and camera motion. In order to address these challenges, a number of methods leverage recent advances in people detection and either use detection for pre-filtering and initialization, or integrate detection, tracking and pose estimation within a single "tracking-by-detection" framework.

Estimation of 3D poses from 2D body part positions has been previously proposed. However, this approach was evaluated only in laboratory conditions for a single subject and it remains unclear how well it generalizes to more complex settings with multiple people. There is also a lot of work on predicting 3D poses directly from image features using regression, classification, or a search over a database of exemplars. These methods typically require a large database of training examples to achieve good performance and are challenged by the high variability in appearance of people in realistic settings.

It is known from an article "People-tracking-by-detection and people-detection-by-tracking" by Andriluka M et al, Computer Vision and Pattern Recognition 2008, CVPR 2008 ISBN: 978-1-4244-2242-5 to provide an image processor having a 2D pose detector for estimating a pose of an object in an image, and 2D tracking for applying 2D tracking by detection.

SUMMARY

The present invention provides methods and apparatus as set out in the claims. In some embodiments of the present invention there is provided monocular 3D human pose estimation and tracking, which is able to recover poses of people in realistic street conditions captured using a monocular, potentially moving camera. Embodiments of the present invention provide a three-stage process. The present invention provides a sound Bayesian formulation to address the above problems. The present invention can provide articulated 3D tracking in realistic street conditions.

The present invention provides methods and apparatus for people detection and 2D pose estimation combined with a dynamic motion prior. The present invention provides not only 2D pose estimation for people in side views, it goes beyond this by estimating poses in 3D from multiple viewpoints. The estimation of poses is done in monocular images, and does not require stereo images. Also the present invention does not require detection of characteristic poses of people.

In methods of the present invention representations are made of the complex appearance of people using separate appearance models for each body part, which reduces the number of required training images and makes the representation more flexible.

In three successive stages the available 2D image evidence is accumulated to enable robust 3D pose recovery. The present invention includes 2D pose estimation from monocular images, tracking-by-detection, and modeling of 3D dynamics based on hierarchical Gaussian process latent variable models. The available 2D image evidence is accumulated from which later 3D poses can be reliably recovered and tracked. A first stage obtains an initial estimate of the 2D articulation and viewpoint of the person from single frames. A second stage allows early data association across frames based on tracking-by-detection. These two stages successfully accumulate the available 2D image evidence into robust estimates of 2D limb positions over short image sequences (=tracklets). A third and final stage uses those tracklet-based estimates as robust image observations to reliably recover 3D pose.

The present invention also provides an integrated circuit having an image processor for executing any of the methods of the invention.

Estimation from (a) multiple cameras and (b) reliance on background subtraction, limits the applicability to scenes with simple backgrounds and static camera. Embodiments of the present invention can provide 3D human pose estimation from a single camera (i.e. monocular images) and can operate with a moving camera in cluttered backgrounds—a scenario in which background subtraction is not possible.

Embodiments of the present invention are not limited necessarily to recovering 2D poses of people seen from a known viewpoint (e.g. from a side view), but embodiments of methods in accordance with the present invention can recover 3D poses of people seen from arbitrary viewpoint.

3D pose estimation is recognised as a more difficult problem than 2D pose estimation and 3D pose estimation from monocular measurements is not a trivial problem. The difficulty depends on a number of factors, such as what kind of measurements are available and how noisy are the measurements. In the case of uncontrolled street scenes, measurements are noisy and 3D pose estimation is difficult.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein. Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination. Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

References to a signal can encompass any kind of signal in any medium, and so can encompass an electrical or optical or wireless signal or other signal for example. References to analyzing can encompass processing a signal in any way to derive or enhance information about the material. References to a processor can encompass any means for processing signals or data in any form and so can encompass for example a personal computer, a microprocessor, analog circuitry, application specific integrated circuits, software for the same, and so on.

In the description provided herein, numerous specific details are set forth. However, it is understood that embodiments of the invention may be practiced without these specific details. In other instances, well-known methods, structures and techniques have not been shown in detail in order not to obscure an understanding of this description.

References to 3D pose represent a 3D configuration of movable parts of the object, not limited to 3D position and orientation of the body.

References to tracking by detection are intended to encompass tracking algorithms that use a generic or adapted object detector or similar, in any way. In some cases the object detector can be one of the components of an evidence model for the algorithm. References to lifting 2D poses to 3D poses are intended to encompass any way of fitting 2D data such as a part of an image, to a 3D object model. An explanation of an example is set out in the abstract and Sec. 1.2 of: D. A. Forsyth, O. Arikan, L. Ikemoto, J. O'Brien, and D. Ramanan. Computational studies of human motion: Part 1, tracking and motion synthesis. Foundations and Trends in Computer Graphics and Vision, 1(2/3):77-254, July 2006.

The present invention provides methods and apparatus for estimation of the 3D pose $Q_m$ of each person in all frames m of a sequence of frames, i.e. a sequence of video images, of length M, given the image evidence $\epsilon_{1:M}$ in all frames.

Figure 9:
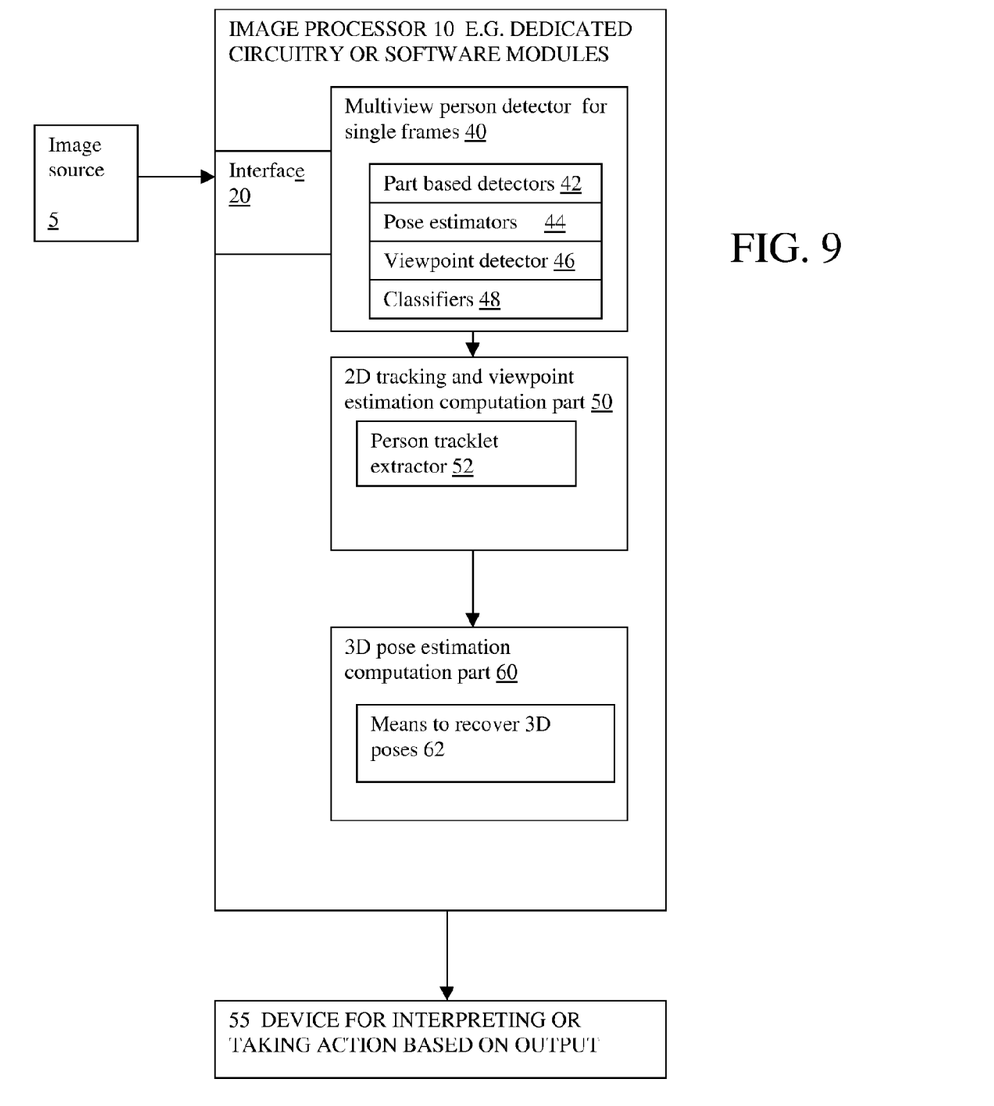
FIG. 9 shows a processing system according to any embodiment of the present invention.
Figure 10:
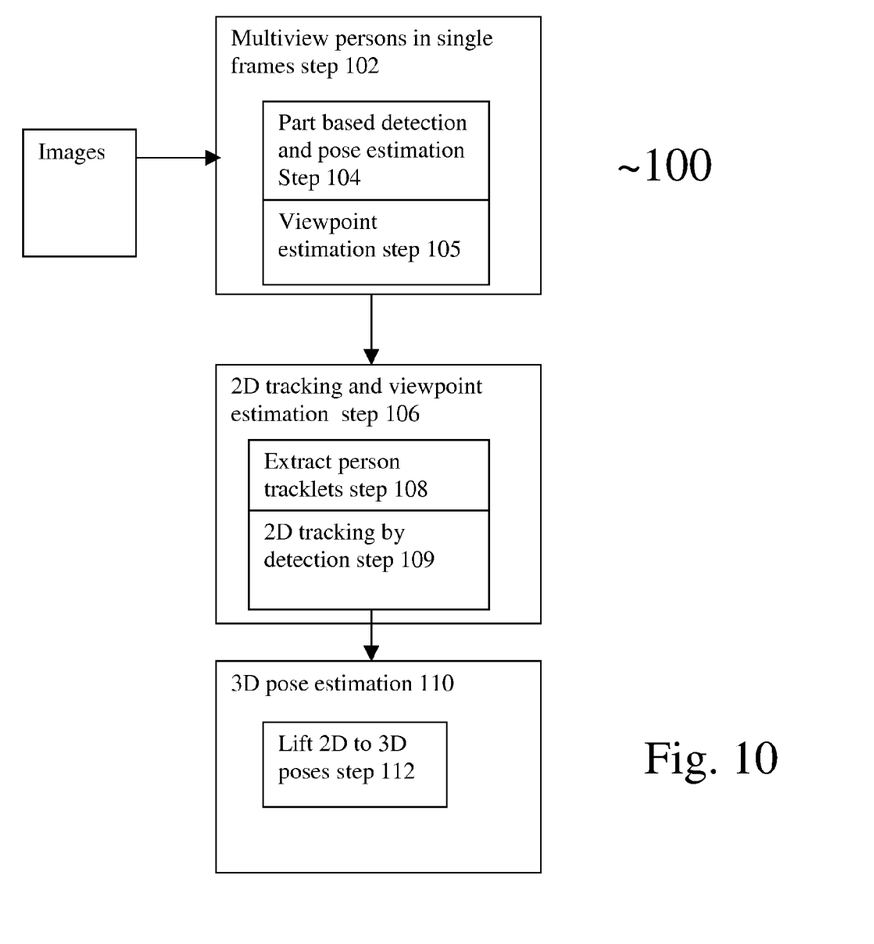
FIG. 10 shows a flow chart for a method according to any embodiment of the present invention.

FIG. 9 shows an image processor or processor system 10 according to an embodiment. FIG. 10 shows steps carried out by this or other embodiments. The image processor or processor system 10 can be implemented as for example one or more integrated circuits having hardware such as circuit blocks dedicated to each of the parts shown, or can be implemented for example as software modules executed by a general purpose processor in sequence, as in a server. The parts shown include an input interface 20 for receiving an input image or image stream (such as frames of a video, in real time or non real time) from an image source device 5, e.g. a monocular camera delivering single frames. The images or frames of the video sequence are processed by a multiview person detection computation part 40. The multiview person detection computation part 40 determines persons in the image using part-based detectors 42 and pose estimators 44 and a viewpoint detector 46. The results of the operation by part 40 are delivered to a tracking and viewpoint estimation computation part 50. This part 50 has a person tracklet extractor 52 which operates as will be described in more detail below. A further 3D pose estimation computation part 60 is provided for recovering 3D poses. There can be other parts to the image processor not shown in this figure, at any stage of the processor.

Appropriate processing of the video data may for example be used for recognition and reporting of main objects relevant to a moving object, e.g. vehicle, or to the driver thereof. Objects of interest may be any suitable object, such as for example and not limited to, the road, pedestrians, vehicles, obstacles, traffic lights, etc. Processing of the video data may be performed in real-time or may be performed on stored video data.

Hence the present invention can be used as an enhancement to a navigational system. Alternatively outputs of the present invention may be used to train other algorithms, e.g. to pedestrian detection algorithms. Outputs of the present invention can be used increase the accuracy of algorithms that detect objects, e.g. pedestrians or movements of these objects. A device 55 can be provided for interpreting or taking action based on an output of the present invention. For example, the detection of poses of pedestrians in the image using the present invention can be used to set off an alarm or other form of warning, apply the brakes etc. This can be used for example in a vehicle control system, or driver assistance system, a robotic system, a surveillance system for detecting intruders and so on. The present invention is not limited to automobiles.

FIG. 10 shows steps in operating the image processor of FIG. 9 or of other embodiments and will be described in more detail below.

In a method 100 according to the present invention a first a posterior distribution over pose parameters is defined given the evidence:

$$p(Q_{1:M}|\epsilon_{1:M}) \propto p(\epsilon_{1:M}|Q_{1:M})p(Q_{1:M}). \quad (1)$$

Here, $Q_{1:M}$ denotes the 3D pose parameters over the entire sequence. To avoid that the posterior in Eq. 1 has many local optima (reason: the estimation of 3D poses is highly ambiguous given monocular images) the present invention proposes a three-stage approach for sequentially reducing the ambiguity in 3D pose recovery.

In order to define the observation likelihood $p(\epsilon_{1:M}|Q_{1:M})$, it is assumed that there is conditional independence of the evidence in each frame given the 3D pose parameters $Q_m$. The likelihood thus factorizes into single-frame likelihoods:

$$p(\varepsilon_{1:M} | Q_{1:M}) = \prod_{m=1}^{M} p(\varepsilon_m | Q_m). \quad (2)$$

The evidence in each frame is represented by the estimate of the person's 2D viewpoint w.r.t. the camera and the posterior distribution of the 2D positions and orientations of body parts. To estimate these reliably from single frames, the first stage 40, in step 102, builds on a part-based people detection and pose estimation framework of step 104 based on the discriminative part detectors 42. To accumulate further 2D image evidence, the second stage 50 executes a tracking and viewpoint estimation step 106 by extracting people tracklets in step 108 from a small number of consecutive frames using a 2D-tracking-by-detection approach 109. The output of the first stage 40 is refined in the sense that more reliable 2D detections of the people's body parts are obtained as well as more robust viewpoint estimates. The third stage 60 then uses the image evidence accumulated in the previous two stages 40, 50 to recover 3D pose.

The temporal prior $p(Q_{1:M})$ is modeled over 3D poses as a hierarchical Gaussian process latent variable model (hG-PLVM) [17]. This is combined with a hidden Markov model (HMM) that allows to extend the people tracklets, which cover only a small number of frames at a time, to possibly longer 3D people-tracks. Note that the 3D model is assumed to generate the bottom-up evidence from 2D body models and thus constitutes a hybrid generative/discriminative approach.

In embodiments of the present invention methods and apparatus for human pose estimation are provided, which combines 2D position, pose and viewpoint estimates into an evidence model for 3D tracking with a 3D motion prior, and is able to accurately estimate 3D poses of multiple people from monocular images in realistic street environments. An aspect of the present invention is a building block for 3D pose estimation, e.g. a pedestrian detection approach based on a combination of multiple part-based models. Combining multiple part-based models leads to significant performance gains, and while improving over the state-of-the art in detection, also allows to estimate viewpoints of people in monocular images.

Multiview people detection in single frames is performed in the image processor computation part 40 and in step 102 as part of the present invention. 2D people detection and pose estimation serves as one of the modules for 3D pose estimation and tracking. The present invention can have any of the following advantages:

(1) Use of 2D people detection and pose estimation is used to define robust appearance models for 3D pose estimation and tracking;
(2) the search space of possible 3D poses can be reduced by taking advantage of inferred 2D poses; and
(3) the viewpoint from which people are visible can be extracted to reduce the inherent 2D-to-3D ambiguity.

In accordance with an aspect of the present invention pictorial structures are used to represent objects, such as people. The pictorial structures comprise a flexible configuration of N different parts $L_m = \{l_{m0}, l_{m1}, \ldots, l_{mN}\}$, where m denotes the current frame of the sequence. The state of part i is given by $l_{mi} = \{x_{mi}; y_{mi}; \theta_{mi}; s_{mi}\}$, where $x_{mi}$ and $y_{mi}$ denote its image position, $\theta_{mi}$ the absolute orientation, and $s_{mi}$ the part scale. The posterior probability of the 2D part configuration $L_m$ given the single frame image evidence $D_m$ is given as $$p(L_m|D_m) \propto p(D_m|L_m)p(L_m). \qquad (3)$$

The prior on body configurations $p(L_m)$ has a tree structure and represents the kinematic dependencies between body parts. It factorizes into a unary term for the root part (here, the torso) and pairwise terms along the kinematic chains:

$$p(L_m) = p(l_{m0}) \prod_{(i,j) \in K} p(l_{mi} | l_{mj}), \qquad (4)$$

where K is the set of edges representing kinematic relationships between parts. p(lm0) is assumed to be uniform, and the pairwise terms are taken to be Gaussian in the transformed space of the joints between the adjacent parts. The likelihood term is assumed to factorize into a product of individual part likelihoods:

$$p(D_m | L_m) = \prod_{i=0}^{N} p(d_{mi} | l_{mi}). \qquad (5)$$

To define the part likelihood, boosted part detectors as disclosed in [3] may be used, which use the truncated output of an AdaBoost classifier [12] and a dense shape context representation [5, 18]. In an embodiment of the present invention a model composed of several parts, e.g. 8 body parts is used: left/right lower and upper legs, torso, head and left/right upper and lower arms (in addition side view detectors also can use left/right feet for better performance). Apart from its excellent performance in complex real world scenes, the pictorial structures model also has the advantage that inference is both optimal and efficient due to the tree structure of the model. Sum product belief propagation is used to compute the marginal posteriors of individual body parts, which can be computed efficiently using convolutions.

Figure 1:
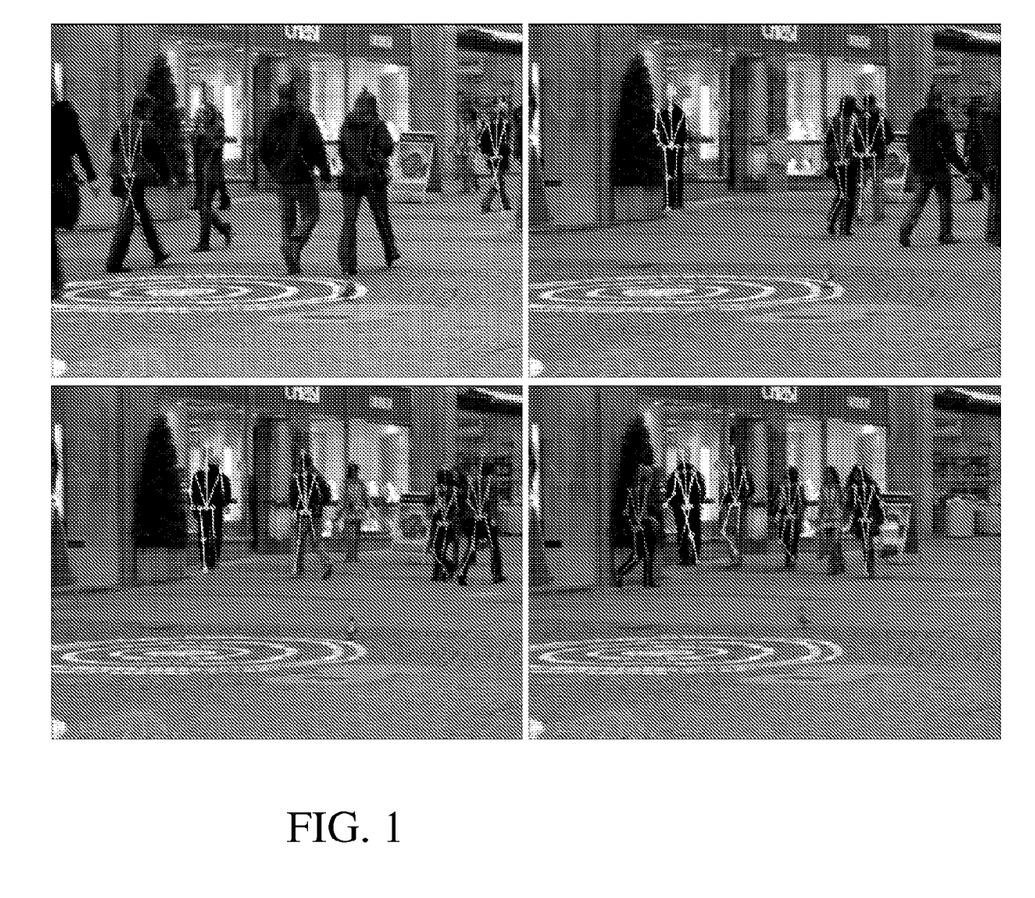
FIG. 1 shows a 3D tracking result according to an embodiment of the present invention in a street scene.
Figure 2:
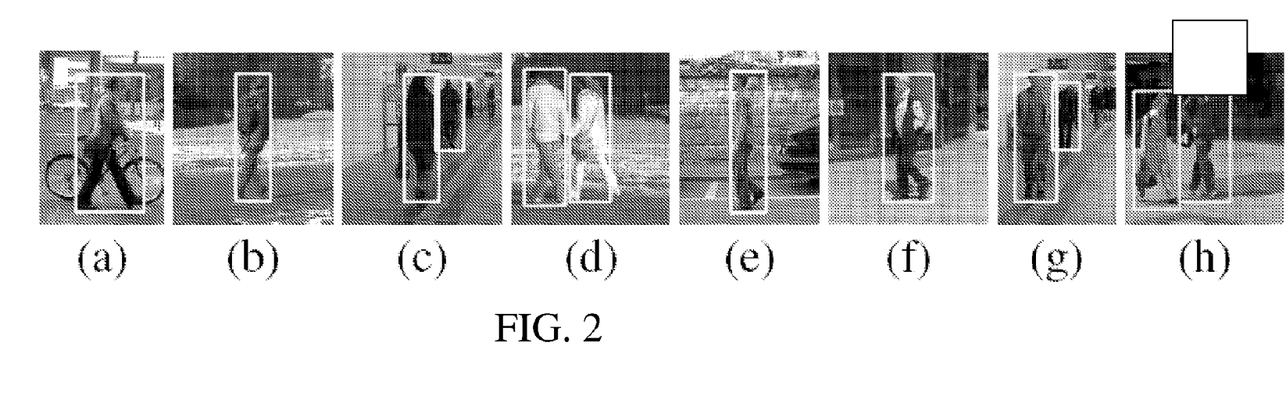
FIG. 2 shows training samples for each viewpoint: (a) right, (b) right-back, (c) back, (d) left-back, (e) left, (f) left-front, (g) front, (h) right-front.
Figure 4:
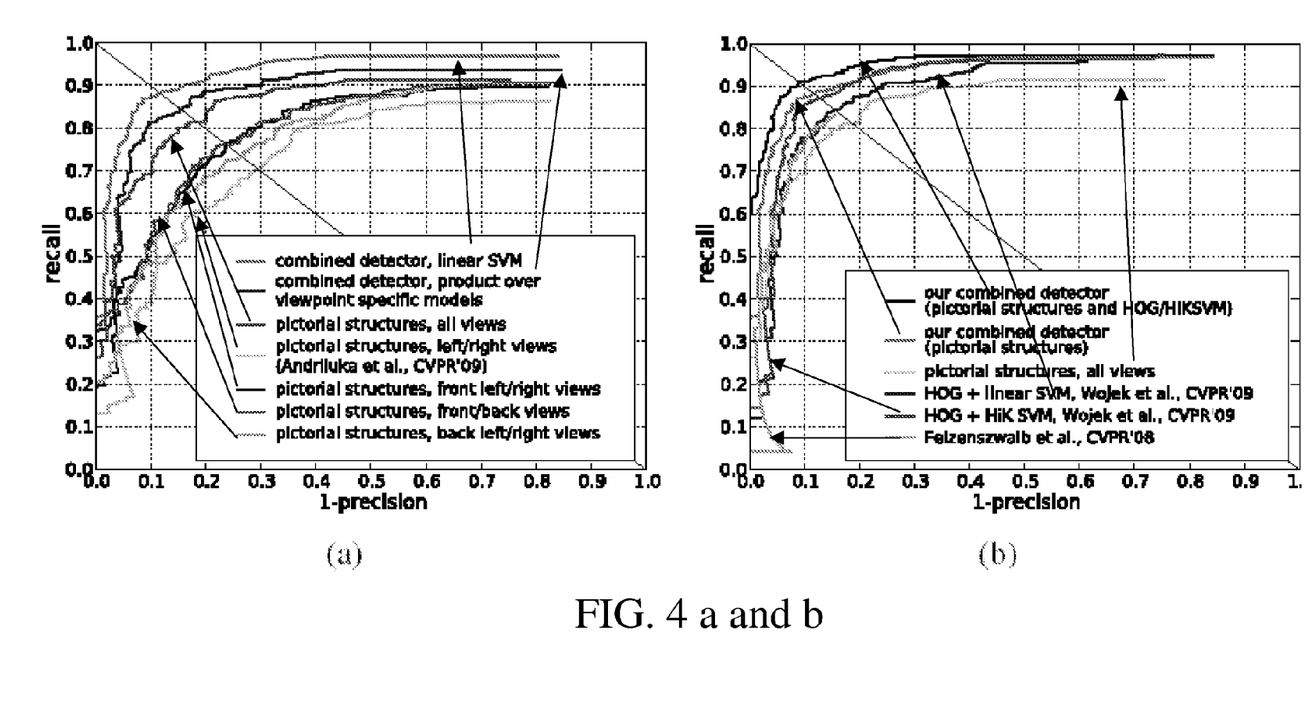
FIG. 4 shows a comparison between (a) viewpoint-specific models and combined model, and (b) comparison to state-of-the-art on the "MultiviewPeople" dataset; (c) sample detections obtained with the side-view detector of [3] (top), the generic detector trained on the multiview dataset (middle), and the detector according to an embodiment of the present invention combining the output of viewpoint-specific detectors with a linear SVM (bottom).
Figure 4C:
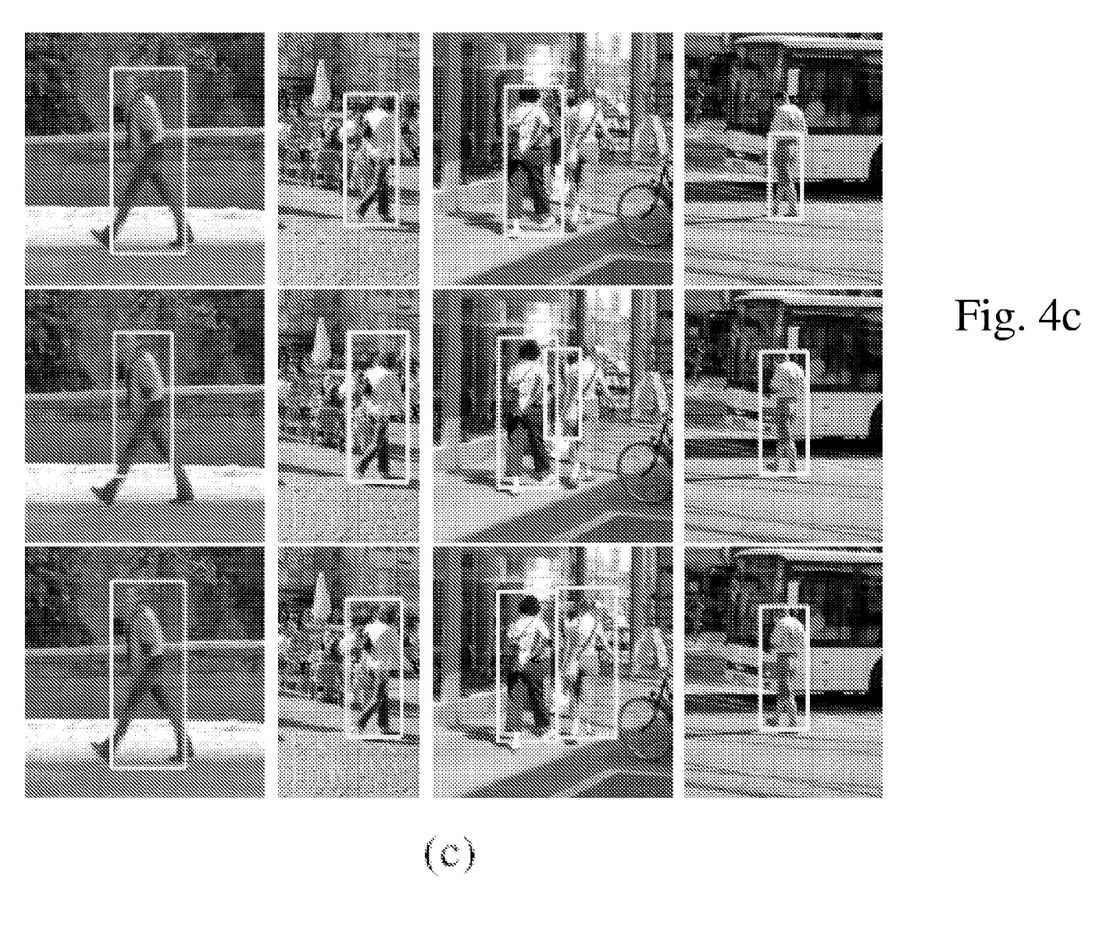

To evaluate the suitability of the detector of [3] for a multiview setting, a dataset of 1486 images was collected for training, 248 for validation, and 248 for testing. These were carefully selected so that sufficiently many people were visible from all viewpoints. In addition to the persons' bounding boxes, the viewpoint of all people was annotated in the dataset by assuming several evenly spaced, e.g. 8 evenly spaced viewpoints, each 45 degrees apart from each other (front/back, left/right, and diagonal front/back left/right). FIG. 2 shows example images from the training set, one for each viewpoint. As expected and can be seen in FIG. 4(a), the detector trained on side-views as in [3] shows only modest performance levels on our multiview dataset. By retraining the model with the multiview training set a substantial performance gain is achieved, but still the performance levels of monolithic, discriminative HOG-based detectors [30] or HOG-based detectors with parts [9] are obtained (see FIG. 4(b)). However, since we not only need to detect people, but also estimate their 2D pose, such monolithic or coarse part-based detectors are not appropriate for the task.

To address this shortcoming, an embodiment of the present invention provides an extended multiview detector 40 that allows 2D pose estimation in part 44 as well as viewpoint estimation in detectors 46. A number such as 8 viewpoint-specific detectors 46 are trained using the viewpoint-annotated multiview data. These viewpoint-specific detectors 46 not only have the advantage that their kinematic prior is specific to each viewpoint, but also that part detectors are tuned to each view. In addition this set of detectors is augmented optionally with one generic detector trained on all views, as well as two optional side-view detectors as in [3] that additionally contain feet (which improves performance). Two embodiments of the present invention provides methods for combining the output of this bank of detectors.

(1) Add up the log posterior of a person being at a particular image location as determined by the different detectors.
(2) a linear SVM (Support Vector Machine) is trained using the 11-dimensional vector of the mean/variance-normalized detector outputs as features. The SVM detector was trained on the validation set of 248 images.

FIG. 4(a) shows that the simple additive combination of viewpoint-specific detectors 46 improved over the detection performance from each individual viewpoint-specific detector. It also outperforms the approach from [3]. Interestingly, the SVM-based detector not only substantially improves performance, but also outperforms the current state-of-the-art in multiview people detection [9, 30]. As is shown in FIG. 4(b), the performance improves even further when the bank of detectors is extended with a HoG-based detector from [30]. Several example detections in FIG. 4(c) demonstrate the benefits of combining viewpoint specific detectors.

TABLE 1

| % | Right | Right-Back | Back | Left-Back | Left | Left-Front | Front | Right-Front | Avg. |
|---|---|---|---|---|---|---|---|---|---|
| Max | 53.7 | 35.5 | 45.7 | 22.6 | 37.9 | 8.6 | 40.0 | 8.3 | 31.1 |
| SVM | 72.6 | 12.7 | 48.6 | 12.3 | 55.7 | 44.5 | 70.4 | 16.2 | 42.2 |
| SVM-adj | 71.4 | 22.3 | 29.5 | 18.0 | 84.7 | 18.1 | 50.7 | 29.2 | 35.4 |

The next step is to estimate the person's viewpoints in step 105 using viewpoint detector 46, since such viewpoint estimates allow to reduce significantly the ambiguity in 3D pose. The bank of viewpoint-specific detectors 46 from above are used and a number of, e.g. 8 viewpoint classifiers 48, linear SVMs, are trained on the detector outputs of the validation set. Two training and evaluation strategies are included within the scope of the present invention 1) (SVM) Only training examples from one of the viewpoints are used as positive examples, the remainder as negative ones.
2) (SVM-adj), where viewpoints are grouped, e.g. into triplets of adjacent ones and separate classifiers 48 are trained for each such triplet.

Figure 3:
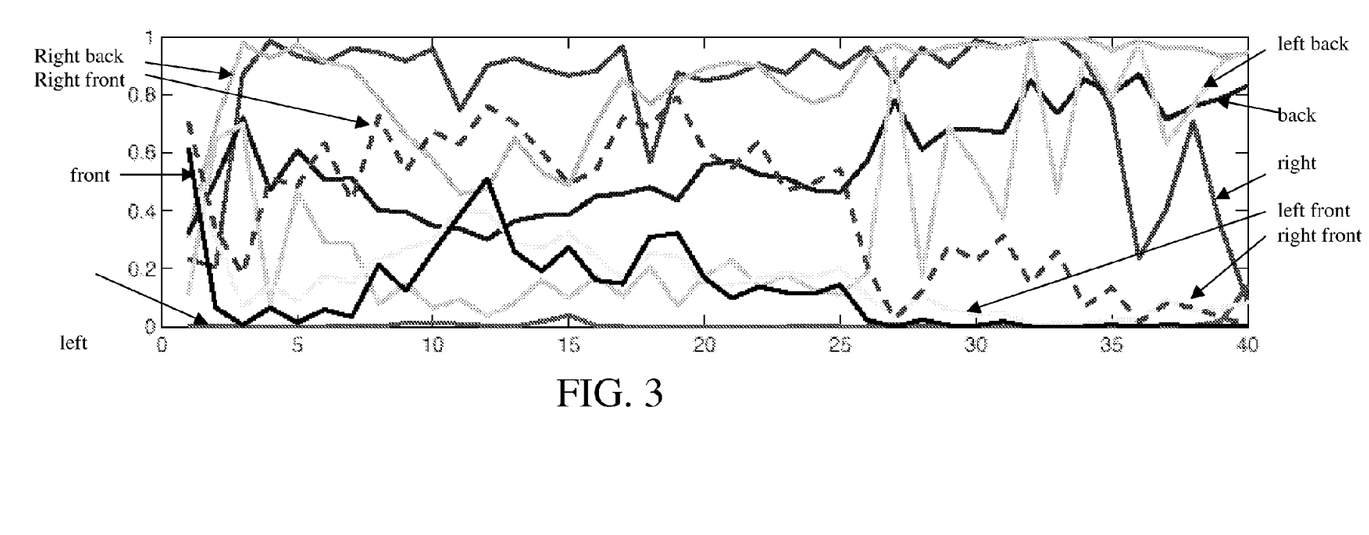
FIG. 3 shows calibrated output of 8 viewpoint classifiers according to an embodiment of the present invention.

As a baseline approach (Max), the viewpoint is estimated in step 105 by taking the maximum over the outputs of the 8 viewpoint-specific detectors. Results are shown in Tab. 1. The SVM embodiment improves over the baseline in case when exact recognition of viewpoint is required by approx. 11%, but the SVM-adj embodiment also performs well. In addition, two adjacent viewpoints are considered as being correct, SVM obtains an average performance of 70:0% and SVM-adj of 76:2%. This shows that SVM-adj more gracefully degrades across viewpoints, which is why it is a preferred embodiment and will be described in the remainder. Since the scores of the viewpoint classifiers 48 are not directly comparable with each other, they are calibrated by computing the posterior of the correct label given the classifier score, which maps the scores to the unit interval. The posterior is computed via Bayes' rule from the distributions of classifier scores on the positive and negative examples. These distributions are assumed to be Gaussian, and their parameters are estimated from classifier scores on the validation set. FIG. 3 shows calibrated outputs of all 8 classifiers 48 computed for a sequence of 40 frames in which the person first appears from the "right" and then from the "right-back" viewpoint. The correct viewpoint is the most probable for most of the sequence, and failures in estimation often correspond to adjacent viewpoints.

Methods and apparatus of the present invention aim at accumulating all available 2D image evidence prior to the third 3D tracking stage 60 in order to reduce the ambiguity of 2D-to-3D lifting as much as possible. While the person detector stage 40 described in the previous section is capable of estimating 2D positions of body parts and viewpoints of people from single frames, the second stage 50 aims to improve these estimates by 2D-tracking-by-detection [2, 31] in step 109. To exploit temporal coherency already in 2D, short tracklets of people are extracted in step 108 using tracklet extractor 52. This, on the one hand, improves the robustness of estimates for 2D positions, scale and viewpoint of each person, since they are jointly estimated over an entire tracklet. Improved body localization in turn aids 2D pose estimation. On the other hand, it also allows to perform early data association. This is important for sequences with multiple people, where it is possible to associate "anonymous" single frame hypotheses with the track of a specific person.

From the first stage 40 and from step 102 of the method a set of $N_m$ potentially overlapping bounding box hypotheses $$\mathcal{H}_m = [h_{m1}, \ldots, h_{mN_m}]$$

are obtained for each frame m of the sequence, where each hypothesis hmi=fhxmi; hymi; hsmig corresponds to a bounding box at particular image position and scale. In order to obtain a set of tracklets, a suitable tracking algorithm is used, e.g. the HMM-based tracking procedure introduced in [2] especially in Section 3.3 thereof which is incorporated by reference. The person hypotheses in each frame are treated as states and state subsequences are found that are consistent in position, scale and appearance by applying Viterbi decoding. The emission probabilities for each state are derived from the detection score. The transition probabilities between states hmi and hm_1;j are modeled using first-order Gaussian dynamics and appearance compatibility:

$$p_{trans}(h_{mi}, h_{m-1,j}) = \mathcal{N}\left(h_{mi} \mid h_{m-1,j}, \sum_{pos}\right) \cdot \mathcal{N}(d_{app}(h_{mi}, h_{m-1,j}) \mid 0, \sigma_{app}^2).$$

where $\Sigma_{pos}=\text{diag}(\sigma_x^2, \sigma_y^2, \sigma_s^2)$, and $d_{app}(h_{mi}|h_{m-1;j})$ is the Euclidean distance between RGB color histograms computed for the bounding rectangle of each hypothesis. For example, $\sigma_x=\sigma_y=5$, $\sigma_s=0:1$ and $\sigma_{app}=0:05$.

For each of the tracklets the viewpoint sequence $\omega_{1:N}=(\omega_1, \ldots, \omega_N)$ is estimated, e.g. by again using a simple HMM and Viterbi decoding or similar algorithm. The 8 discrete viewpoints are considered as states, the viewpoint classifiers are considered as unary evidence, and Gaussian transition probabilities are assumed that enforce similar subsequent viewpoints to reflect that people tend to turn slowly.

Figure 5:
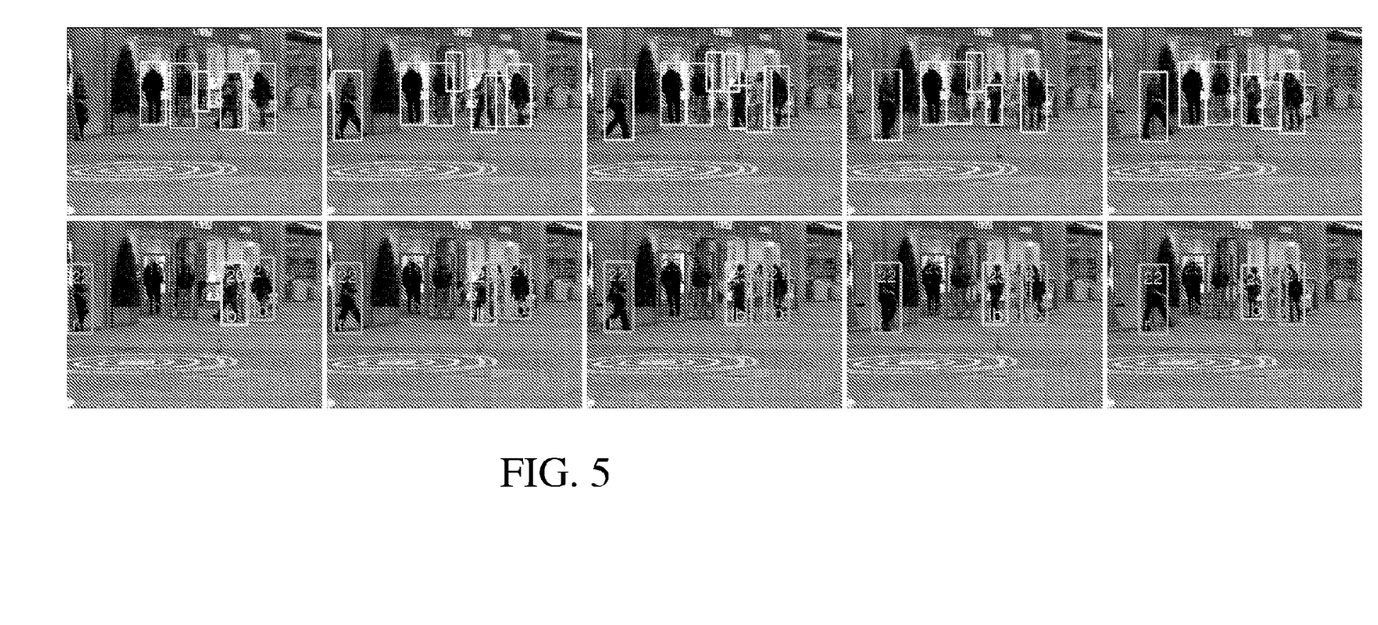
FIG. 5 shows people detection based on single frames (top) and tracklets found by a 2D tracking algorithm according to an embodiment of the present invention. Different tracklets are identified by color and the estimated viewpoints are indicated with two letters (bottom). Note that several false positives in the top row are filtered out and additional—often partially occluded—detections are filled in (e.g., on the left side of the leftmost image).

FIG. 5 shows an example of a short subsequence in which a comparison is made between the detection results of the single-frame 2D detector with the extracted tracklets. Note how tracking helps to remove the spurious false positive detections in the background, and corrects failures in scale estimation, which would otherwise hinder correct 2D-to-3D lifting. In FIG. 3 the single frame prediction scores are shown for each viewpoint for the tracklet corresponding to the person with index 22 on FIG. 5. Note that while viewpoint estimation from single frames is reasonably robust, it can still fail at times (the correct viewpoint is "right" for frames 4 to 30 and "right-back" for frames 31 to 40). The tracklet-based viewpoint estimation, in contrast, yields the correct viewpoint for the entire 40 frame sequence. Finally, as demonstrated in FIG. 5, the tracklets also provide data association even in case of realistic sequences with frequent full and partial occlusions.

Figure 6:
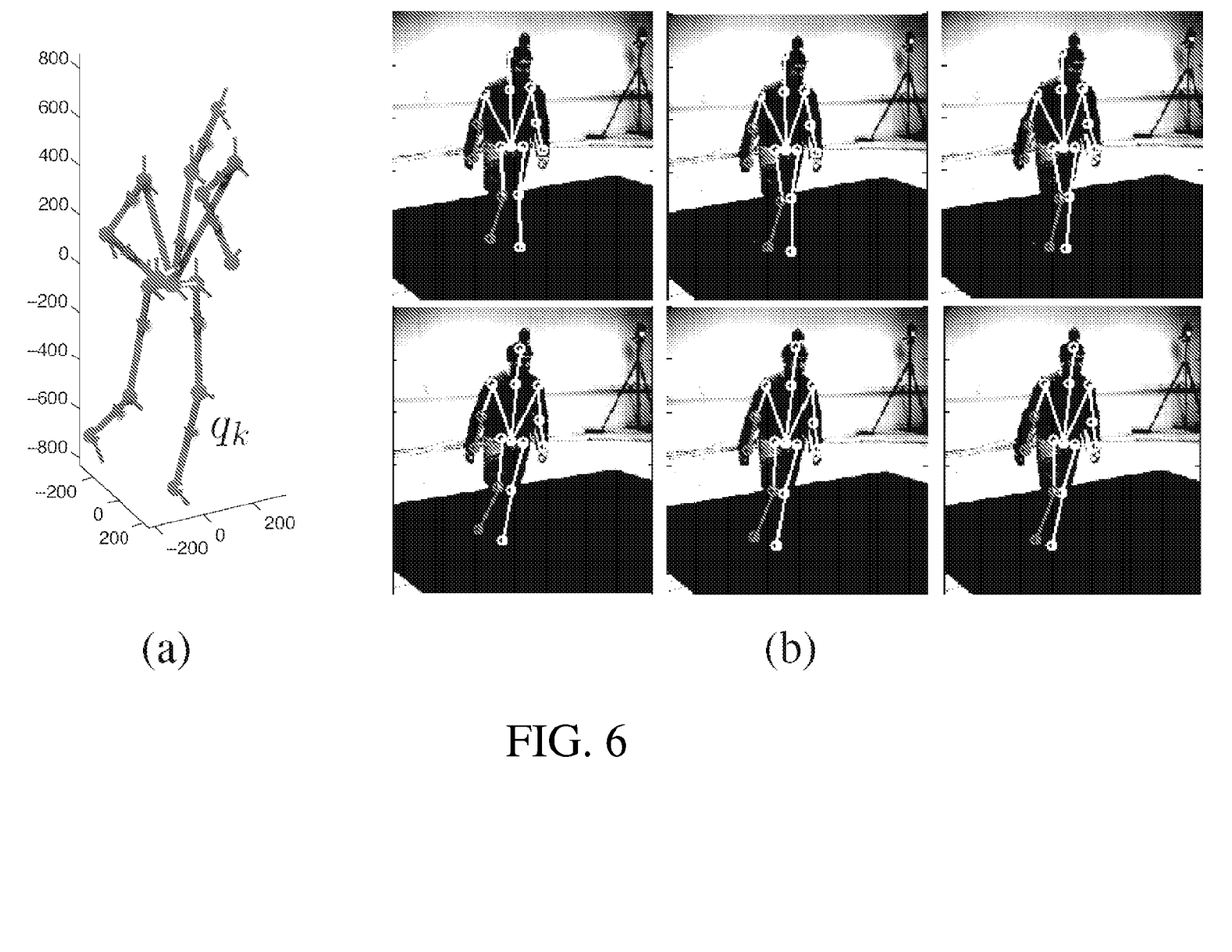
FIG. 6 (a) shows a representation of the 3D pose in a model according to an embodiment of the present invention (parametrized joints are marked with arrows). (b): Initial pose sequence after 2D-to-3D lifting (top) and pose sequence after optimization of the 3D pose posterior (bottom).

In method step 110 using the computation part 60, poses in 3D are estimated and tracked by first taking the 2D tracklets extracted in the previous stage and the 2D poses estimated for each frame are lifted into 3D (c.f. [25]) in step 112, which is preferably done with the help of a set of 3D exemplars [19, 22]. Projections of the exemplars are first evaluated under the 2D body part posteriors, and the exemplar with the most probable projection is chosen as an initial 3D pose. This initial pose is propagated to all frames of the tracklet using the known temporal ordering on the exemplar set. Note that this yields multiple initializations for 3D pose sequences, one for each frame of the tracklet. This 2D-to-3D lifting procedure of step 112 is robust, because it is based on reliable 2D pose posteriors, and detections and viewpoint estimates from the 2D tracklets. Starting from these initial pose sequences, the actual pose estimation and tracking is done in a Bayesian framework by maximizing the posterior defined in Eq. (1), for which they serve as powerful initializations. The 3D pose is parametrized as $Q_m=\{q_m, \phi_m, h_m\}$, where $q_m$ denotes the parameters of body joints, $\phi_m$ the rotation of the body in world coordinates, and $h_m=\{h_m^x; h_m^y; h_m^{scale}\}$ the position and scale of the person projected to the image. The 3D pose is represented using a kinematic tree with P=10 flexible joints, in which each joint has 2 degrees of freedom. A configuration example is shown in FIG. 6(a). The evidence at frame m is given by the $\epsilon_m=\{D_m, \omega_m\}$, and consists of the single frame image evidence $D_m$ and the 2D viewpoint estimate $\omega_m$ obtained from the entire tracklet. Assuming conditional independence of 2D viewpoint and image evidence given the 3D pose, the single frame likelihood in Eq. 2 factorizes as $$p(\epsilon_m|Q_m)=p(\omega_m|Q_m)p(D_m|Q_m). \tag{6}$$

Based on the estimated 2D viewpoint $\omega_m$, the viewpoint likelihood of the 3D viewpoint $\phi_m$ is modeled as a Gaussian centered at the rotation component of $\phi_m$ along the y-axis:

$$p(\omega_m|Q_m) = \mathcal{N}(\omega_m|\text{proj}_y(\phi_m), \sigma_\omega^2). \quad (7)$$

The likelihood of the 3D pose $p(D_m|Q_m)$ is defined with the help of the part posteriors given by the 2D body model:

$$p(D_m|Q_m) = \prod_{n=1}^{N} p(\text{proj}_n(Q_m)|D_m), \quad (8)$$

where $\text{proj}_n(Q_m)$ denotes the projection of the n-th 3D body part into the image. While such a 3D likelihood is typically defined as the product of individual part likelihoods similarly to Eq. 5, this leads to highly multimodal posteriors and difficult inference. By relying on 2D part posteriors instead, the 3D model is focused on hypotheses for which there is sufficient 2D image evidence from previous stages. To avoid expensive 3D likelihood computations, each 2D part posterior is preferably represented using a non-parametric representation. In particular, for each body part n in frame m, the J locations are found with the highest posterior probability $$E_{mn} = \{(l_{mn}^j, w_{mn}^j), j=1, \ldots, J\}, \text{where } l_{mn}^j \in \mathbb{R}^4$$

that corresponds to the 2D location (image position and orientation) and $w_{mn}^j$ to the posterior density at this location. Given that, the 2D part posterior is approximated as a kernel density estimate with Gaussian kernel $\kappa$:

$$p(\text{proj}_n(Q_m)|D_m) \approx \sum_j w_{mn}^j \kappa(l_{mn}^j, \text{proj}_n(Q_m)). \quad (9)$$

The temporal prior in Eq. 1 is represented as the product of two terms:

$$p(Q_{1:M}) = p(q_{1:M})p(h_{1:M}), \quad (10)$$

which correspond to priors on the parameters of 3D pose as well as image position and scale. The prior on the person's position and scale $p(h_{1:M})$ is taken to be a broad Gaussian and models smooth changes of both the scale of the person and its position in the image. The prior over the parameters of the 3D pose $q_{1:M}$ is modeled with a hierarchical Gaussian process latent variable model (hGPLVM) [17] or similar. The M dimensional vector of the values of i-th pose parameter across all frames are denoted as $q_{1:M,i}$. In the hGPLVM each dimension of the original high-dimensional pose is modeled as an independent Gaussian process defined over a shared low dimensional latent space $Z_{1:M}$:

$$p(q_{1:M}|Z_{1:M}) = \prod_{i=1}^{P} \mathcal{N}(q_{1:M,i}|0, K_z), \quad (11)$$

where P is the number of parameters in our pose representation, $K_z$ is a covariance matrix of the elements of the shared latent space $Z_{1:M}$ defined by the output of the covariance function $k(z_i, z_j)$, which in this case is taken to be squared exponential. The values of the shared latent space $Z_{1:M}$ are themselves treated as the outputs of Gaussian processes with a one dimensional input, the time $T_{1:M}$. The implementation uses, for example, a $d_1=2$ dimensional shared latent space. Such a hierarchy of Gaussian processes allows to effectively model both correlations between different dimensions of the original input space and their dynamics.

The hGPLVM prior requires two sets of auxiliary variables $Z_{1:M}$ and $T_{1:M}$, which need to be dealt with during maximum a-posteriori estimation. One embodiment of the present invention optimizes Z only and keeps the values of T fixed. This is possible since the values of T roughly correspond to the person's state within a walking cycle, which can be reliably estimated using the 2D tracklets. The full posterior over 3D pose parameters being maximized is given by:

$$p(Q_{1:M}, Z_{1:M}|\epsilon_{1:M}, T_{1:M}) \propto p(\epsilon_{1:M}|Q_{1:M}) \cdot p(q_{1:M}|Z_{1:M})$$
$$p(Z_{1:M}|T_{1:M})p(h_{1:M}). \quad (12)$$

The posterior is optimised using scaled conjugate gradients and by initializing the optimization using the lifted 3D poses.

For 3D pose estimation for longer sequences alternative methods can be used. In order to estimate 3D poses in longer sequences, first 3D poses are estimated in short (M=10) overlapping subsequences of the longer sequence. Since for each subsequence the posterior multiple times are initialized and locally optimized, a large pool of 3D pose hypotheses for each of the frames is left, from which the optimal sequence can be found by a suitable algorithm, e.g. using a hidden Markov model and Viterbi decoding. The 3D pose hypotheses are treated in each frame as discrete states with emission probabilities given by Eq. 6 and define transition probabilities between states using the hGPLVM.

The above models have been evaluated in two diverse scenarios. The results indicated that the methods of the present invention improve the state-of-the art in monocular human pose estimation on the standard "Human Eva II" benchmark, for which ground truth poses are available. In addition the present invention has been evaluated on two cluttered and complex street sequences with multiple people including partial and full occlusions.

The "HumanEva II" dataset was used in order to quantitatively evaluate the performance of the 3D pose estimation method. "HumanEva II" dataset [23], provides synchronized images and motion capture data and is a standard evaluation benchmark for 2D and 3D human pose estimation. On this dataset a comparison is made with a method estimating poses in monocular image sequences without background subtraction, but relying on both appearance and temporal information. For this experiment viewpoint specific models were trained on the images of subjects "S1", "S2", "S3" from the "HumanEva" dataset. Adding more training data improves the performance of part detectors, especially for the lower and upper arm body parts. Accordingly, the training data was extended with the images from the "People" [20] and "Buffy" [10] datasets. The set of exemplars for 2D-to-3D lifting and the hGPLVM used to model the temporal dynamics on the pose sequences were obtained using training data for subject "S3" of the "HumanEva" dataset. Despite the limited training data, this prior enables pose estimation on the "HumanEva II" dataset as well as in realistic street scenes. Table 2 shows the mean error in the estimation of 2D and 3D joint locations, obtained using the official online evaluation tool.

TABLE 2

| Subj./Cam. | 2D Mean (Std) [21] | 2D Mean (Std) | 3D Mean (Std) |
|---|---|---|---|
| S2/C1 | 12.98 (3.5) | 10.49 (2.70) | 107 (15) |
| S2/C2 | 14.18 (4.38) | 10.72 (2.44) | 101 (19) |

Figure 8:
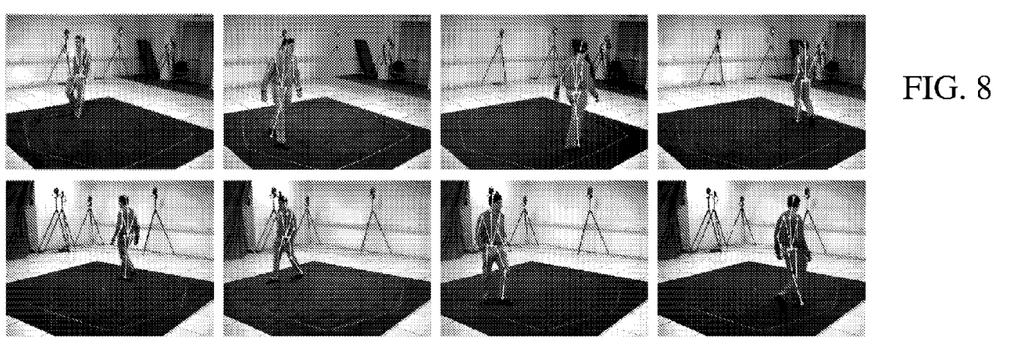
FIG. 8 shows 3D pose estimation examples on HumanEva II for "Subject S2/Camera C1" (top) and "Subject S2/Camera C2" (bottom).

For both sequences the results are improved substantially over those reported by [21]. The improvement is especially large for the sequence taken with camera "C2", on which an average error of 10.72 pixels is obtained, compared to 14.18 pixels. The 3D pose estimation of the present invention obtains a mean error of 107 and 101 millimeters for cameras "C1" and "C2". FIG. 8 shows several examples of estimated poses obtained by a method of the present invention on both sequences, visualizing every 100-th frame. The better localization accuracy of methods according to the present invention relies on the continuous optimization of 3D pose given the body part positions rather than selecting one from a discrete set of exemplars.

Figure 7:
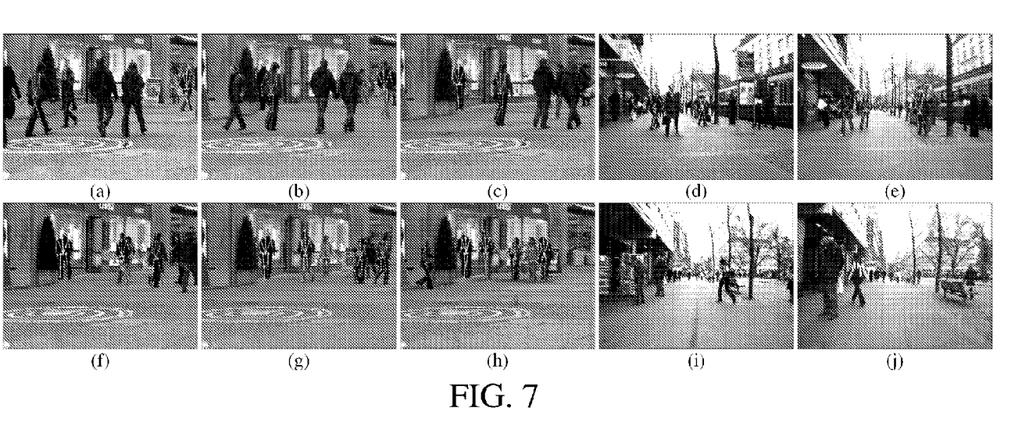
FIG. 7 shows 3D pose estimation on the "TUD Stadtmitte" dataset (left) and on a sequence from a moving camera [14] (right).

To evaluate the present invention for a realistic street setting, the novel "TUD Stadtmitte"' dataset containing 200 consecutive frames taken in a typical pedestrian area was used. Over the 200 frames of this sequence the 2D tracking algorithm of embodiments of the present invention obtained 25 2D people-tracks, none of which contained false positive detections. FIG. 7 (left) shows example images evenly spaced throughout the sequence. For every track an estimate is made of the viewpoint of the person using exclusively the viewpoint classification algorithm of the present invention. The direction of movement of the person can be integrated into the estimate. Estimate of 3D poses are correct over a diverse range of viewpoints including those with significant depth ambiguity and difficult imaging conditions. Note, for example, the people on the right side of image FIG. 7(*a*) and the people in the middle of the image in FIG. 7(*h*). The motion prior was trained on a different set—the "HumanEva" dataset, and despite this it generalized well to the street setting. The estimate of the pose of the person standing still was also correct, as is shown in FIG. 7(*c*,*f*,*g*).

Several incorrectly estimated poses are due to incorrect scale estimation as in FIG. 7(*a*), partial occlusion FIG. 7(*b*,*f*), or failure in viewpoint estimation (e.g. the rightmost person in FIG. 7(*h*)). The present invention was also evaluated on a sequence recorded by a moving camera. Due to the high amount of background clutter, low frame-rate and many people in near frontal views, this sequence presents significant challenges for 3D pose estimation. Several examples of estimated 3D poses are shown in FIG. 7 (right). Note that even under such challenging conditions the present invention can track and estimate poses of people over a large number of frames, e.g. the rightmost person in FIG. 7(*i*,*j*). Also note that tracking and viewpoint estimation produced correct results even in the presence of strong background clutter, e.g. for the rightmost person in FIG. 7(*d*,*e*).6.

The following references are incorporated by reference:
[1] A. Agarwal and B. Triggs. Recovering 3D human pose from monocular images. PAMI, 28(1):44-58, 2006.
[2] M. Andriluka, S. Roth, and B. Schiele. People-tracking-by-detection and people-detection-by-tracking. In CVPR-08.
[3] M. Andriluka, S. Roth, and B. Schiele. Pictorial structures revisited: People detection and articulated pose estimation. In CVPR-09.
[4] A. Balan, L. Sigal, M. Black, J. Davis, and H. Haussecker. Detailed human shape and pose from images. In CVPR-07.
[5] S. Belongie, J. Malik, and J. Puzicha. Shape context: A new descriptor for shape matching and object recognition. In NIPS*00.
[6] J. Deutscher and I. Reid. Articulated body motion capture by stochastic search. IJCV, 61:185-205, February 2005.
[7] M. Eichner and V. Ferrari. Better appearance models for pictorial structures. In BMVC-09.
[8] P. F. Felzenszwalb and D. P. Huttenlocher. Pictorial structures for object recognition. IJCV, 61:55-79, January 2005.
[9] P. F. Felzenszwalb, D. McAllester, and D. Ramanan. A discriminatively trained, multiscale, deformable part model. In CVPR-08.
[10] V. Ferrari, M. Marin, and A. Zisserman. Progressive search space reduction for human pose estimation. In CVPR-08.
[11] A. Fossati, M. Dimitrijevic, V. Lepetit, and P. Fua. Bridging the gap between detection and tracking for 3D monocular video-based motion capture. In CVPR-07.
[12] Y. Freund and R. Schapire. A decision-theoretic generalization of on-line learning and an application to boosting. J. of Comp. and Sys. Sc., 55(1):119-139, 1997.
[13] J. Gall, B. Rosenhahn, T. Brox, and H.-P. Seidel. Optimization and filtering for human motion capture: A multi-layer framework. IJCV, 87(1-2), March 2010.
[14] S. Gammeter, A. Ess, T. Jaeggli, K. Schindler, B. Leibe, and L. Gool. Articulated multi-body tracking under ego-motion. In ECCV-08.
[15] N. Hasler, B. Rosenhahn, T. Thormaehlen, M. Wand, and H.-P. Seidel. Markerless motion capture with unsynchronized moving cameras. In CVPR-09.
[16] C. Ionescu, L. Bo, and C. Sminchisescu. Structural SVM for visual localization and continuous state estimation. In ICCV-09.
[17] N. D. Lawrence and A. J. Moore. Hierarchical Gaussian process latent variable models. In ICML-07.
[18] K. Mikolajczyk and C. Schmid. A performance evaluation of local descriptors. PAMI, 27(10):1615-1630, 2005.
[19] G. Mori and J. Malik. Recovering 3D human body configurations using shape contexts. PAMI, 28(7):1052-1062, 2006.
[20] D. Ramanan. Learning to parse images of articulated objects. In NIPS*06.
[21] G. Rogez, J. Rihan, S. Ramalingam, C. Orrite, and P. H. Torr. Randomized trees for human pose detection. In CVPR-08.
[22] G. Shakhnarovich, P. A. Viola, and T. Darrell. Fast pose estimation with parameter-sensitive hashing. In ICCV-03.
[23] L. Sigal and M. Black. HumanEva: Synchronized video and motion capture dataset for evaluation of articulated human motion. Technical report, Brown University, 2006.
[24] L. Sigal and M. J. Black. Measure locally, reason globally: Occlusion-sensitive articulated pose estimation. In CVPR-06.
[25] L. Sigal and M. J. Black. Predicting 3D people from 2D pictures. In AMDO 2006.
[26] Z. Tu, X. Chen, A. L. Yuille, and S.-C. Zhu. Image parsing: Unifying segmentation, detection, and recognition. IJCV, 63(2):113-140, 2005.
[27] R. Urtasun and T. Darrell. Local probabilistic regression for activity independent human pose inference. In ICCV-09.
[28] R. Urtasun, D. J. Fleet, and P. Fua. 3D people tracking with Gaussian process dynamical models. In CVPR-06.
[29] M. Vondrak, L. Sigal, and O. C. Jenkins. Physical simulation for probabilistic motion tracking. In CVPR-08.
[30] C. Wojek, S. Walk, and B. Schiele. Multi-cue onboard pedestrian detection. In CVPR-09.
[31] B. Wu and R. Nevatia. Detection and tracking of multiple, partially occluded humans by Bayesian combination of edgelet based part detectors. IJCV, 75:247-266, November 2007.

The invention claimed is:
1. An image processor for detection and tracking of a 3D pose of each of multiple objects in a sequence of monocular images, the 3D pose representing at least a 3D configuration of movable parts of the object, the image processor comprising:
- one or more 2D pose detectors for estimating a pose of each of the multiple objects in an image;
- a 2D tracking and viewpoint estimation computation part for receiving the outputs of the 2D pose detectors and being adapted to apply 2D tracking by detection, the 2D tracking exploiting temporal coherency; and
- a 3D pose estimation computation part for estimating and tracking the 3D poses of the multiple objects in the sequence of images from the output of the 2D tracking and viewpoint estimation computation part;
- wherein the image processor further comprises
- a 2D viewpoint detector for estimating a viewpoint of each of the multiple objects in the image; and
- the 2D tracking and viewpoint estimation computation part further receiving the outputs of the 2D viewpoint detector and being adapted to at least improve the outputs of the 2D viewpoint detector; the 2D tracking and viewpoint estimation computation part using the 2D tracking by detection for viewpoint tracking;
- and the 3D pose estimation computation part being adapted to lift 2D poses to recover 3D pose images by relying on at least a set of 3D exemplars and the output of the 2D tracking and viewpoint estimation computation part.

2. The image processor of claim 1, further comprising one or more part based detectors for detecting parts of the multiple objects for supply to the 2D pose detector.

3. The image processor of claim 2, wherein the one or more part based detectors make use of a pictorial structure model of the object and/or wherein the one or more part based detectors are viewpoint specific detectors.

4. The image processor of claim 2 further comprising an SVM detector, the output of the one or more part based detectors being fed to the SVM detector, or further comprising a classifier, the output of the one or more part based detectors being fed to the classifier.

5. The image processor of claim 1, the 2D tracking and viewpoint estimation computation part comprising a tracklet extractor.

6. The image processor of claim 5, further comprising a viewpoint estimator for estimating a sequence of viewpoints of each tracklet obtained from the tracklet extractor.

7. A method of using an image processor for detection of a 3D pose of each of multiple objects in a sequence of monocular images, the 3D pose representing at least a 3D configuration of movable parts of the object, the method having the steps of:
- estimating a 2D pose of each of the multiple objects in an image;
- applying 2D tracking-by-detection to the estimated 2D pose detector to produce an output, the 2D tracking exploiting temporal coherency;
- estimating a 2D viewpoint of each of the multiple objects in the image; and
- estimating a 3D pose of each of the multiple objects using an output of the 2D tracking-by detection and viewpoint estimation, the estimating being adapted to lift 2D poses to recover 3D pose images by relying on at least a set of 3D exemplars and the viewpoint estimation;
- wherein the 2D tracking-by-detection is applied to the estimated 2D viewpoint to at least improve the estimated 2D viewpoint.

8. The method of claim 7, wherein estimating the 2D pose comprises detecting parts of each of the multiple objects in the image.

9. The method of claim 7, wherein detecting parts of the multiple objects makes use of a pictorial structure model of each of the multiple objects and/or
- wherein detecting parts of the multiple objects is viewpoint specific.

10. The method of claim 7, wherein the part based detection step is followed by a classification step.

11. The method of claim 7, wherein estimation of the 2D tracking and viewpoint comprises extracting tracklets from the image.

12. The method of claim 11, further comprising estimating a viewpoint of each tracklet.

13. The method of claim 7, wherein the 3D pose estimation comprises lifting 2D poses to 3D poses.

14. A non-transitory computer readable medium and having instructions which when executed by a computer cause the computer to carry out the method of claim 7.

* * * * *